United States Patent [19]

Masubuchi et al.

[11] 4,069,408

[45] Jan. 17, 1978

[54] METHOD AND APPARATUS FOR UNDERWATER SUBMERGED ARC WELDING

[75] Inventors: Koichi Masubuchi, Arlington; Chon-Liang Tsai, Cambridge, both of Mass.

[73] Assignee: Massachusetts Institute of Technology, Cambridge, Mass.

[21] Appl. No.: 693,576

[22] Filed: June 7, 1976

[51] Int. Cl.² .............................................. B23K 9/18
[52] U.S. Cl. ................................... 219/72; 219/73 R; 219/73 A
[58] Field of Search ..................... 219/72, 73 R, 73 A

[56] References Cited
U.S. PATENT DOCUMENTS 3,876,852  4/1975  Topham ................................ 219/72

*Primary Examiner*—Elliot A. Goldberg
*Attorney, Agent, or Firm*—Arthur A. Smith, Jr.; Martin M. Santa; Robert Shaw

[57] ABSTRACT

According to the method and apparatus of this invention, water is kept away from the arc in underwater arc welding by means of material contained in a water-tight enclosure. The water-tight enclosure is formed by pressing the seal at the bottom of the enclosure against the object to be welded and by closing the opening for the electrode on top of the enclosure by using the fluid nature of a viscous polymer. Gas generated in the enclosure during welding is expelled through check valves located along two longitudinal sides of the enclosure.

The enclosure is prepared above the water surface and then delivered to the welding site. No inert gas is needed.

12 Claims, 1 Drawing Figure

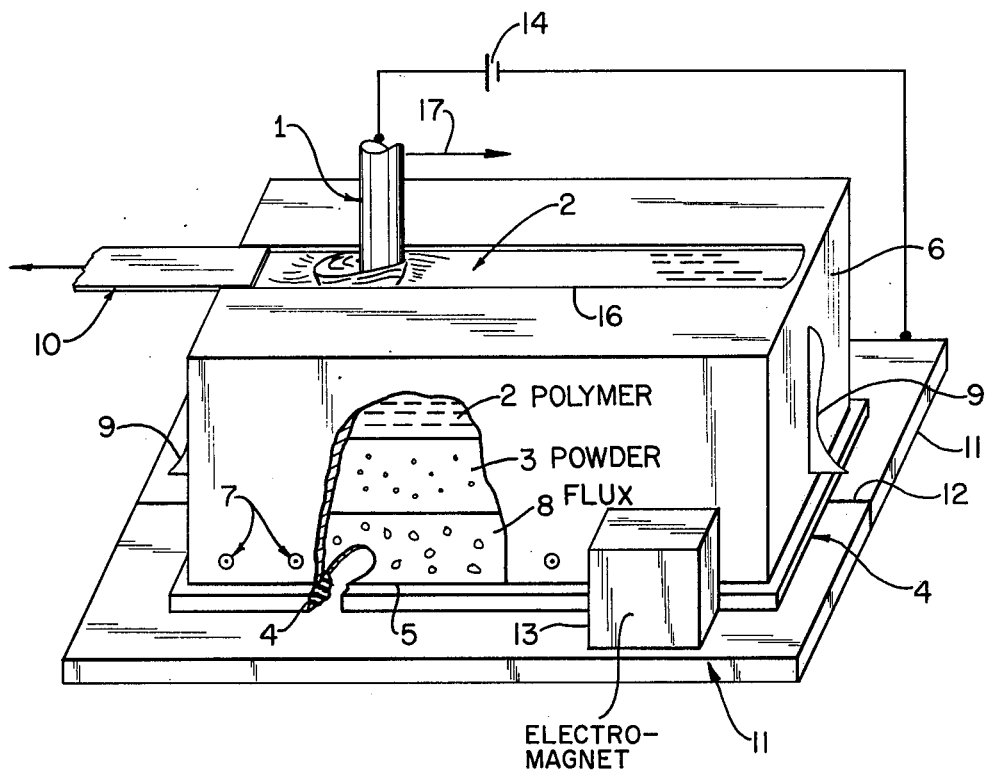

METHOD AND APPARATUS FOR UNDERWATER SUBMERGED ARC WELDING

BACKGROUND AND SUMMARY OF THE INVENTION

The Government has rights in this invention pursuant to Grant No. 04-6-158-44007 awarded by the National Oceanographic Atmospheric Administration, Sea Grant and has reserved rights as set forth in Section 1(f) and 1(g) of the Oct. 10, 1963, Presidential Statement of Government Patent Policy.

The invention relates to underwater submerged arc welding, which is an electric welding process in which a consumable electrode is fed into a weld zone at a controlled rate while a continuous blanket of molten flux shields the weld zone from contamination. More particularly, this invention has as an object the provision of a device and method which enables the utilization of a submerged arc welding process underwater. More particularly, the invention provides a device which eliminates water contact in the arc area during underwater welding and hence reduces greatly the rapid cooling experienced in the conventional underwater welding processes. This feature together with other objects and features such as the absence of the need for water-displacing gases, the absence of water-current effect, and minimum hydrogen content in the arc area will become apparent from the detailed description of the invention.

The quality of welds made with conventional underwater wet welding processes is usually not sound. The moisture surrounding the arc goes into the weld and embrittles the weld. The rapid cooling due to water bubbling because of concentrated arc heat induces martensitic structure in heat affected zone of the weld. Code quality cannot be achieved. On the other hand, dry chamber quality underwater welding process is not economically feasible, although a sound weld can be produced with this technique.

It is therefore a general object of the present invention to provide an improved underwater welding method and apparatus. By means of the method and apparatus of this invention, the inventors have made it possible to keep water away from the weld area and maintain a continuous slag covering on the weld head throughout the welding period. Code quality can therefore be achieved.

The FIGURE shows a partial cross section of the apparatus of this invention.

DETAILED DESCRIPTION OF THE INVENTION

A flux-stuffed enclosure 6 is prepared with three layers of chemicals. At the bottom of the enclosure, layer 8 is conventional welding flux which provides a continuous protective environment during welding. A layer of powder insulation material 3 above layer 8, such as limestone powder, is able to withstand high temperature, is an electrical insulator, and provides a drying agent which absorbs any water moisture which penetrates through sealing layer 3 because of electrode 1 motion during welding. The thermally insulating material 2 also retains heat in the enclosure 6 to give a tempering effect on the bead behind the arc produced during welding. The top sealing layer 2 is used to prevent water from penetrating into the layers 3, 8. It has been found that a water insoluble, high viscosity polymer such as Polybutene No. 24 by Chevron having a viscosity of 1000 SFU at 210° F, functions well as a water seal for the moving electrode when welding is occurring.

The bottom sheet 5 of the enclosure 6 comprises a sheet of metal or plastic which is attached to the side walls of the enclosure. The bottom sheet 5 holds the layers, 2, 3 and 8 in the enclosure and prevents water from wetting the flux 8 which is contiguous to the bottom sheet 5. The bottom sheet 5 may be made of very thin steel, aluminum foil or other electrically conductive material of sufficient strength to contain the contents of the enclosure. Its thickness should also be such that when electrode 1 which has penetrated layers 2, 3 and 8 and is electrically energized by source 14 touches sheet 5 the arc produced melts the sheet 5 and also the electrode 1, the base metal 11, and the flux 8 into a common pool. The molten flux acts as a cleaning agent and floats to the top of the weld to form a protective slag while the weld solidifies as in conventional welding.

Alternatively, a thin plastic or other electrical nonconductor which is easily penetrated by the welding electrode may be used as the bottom sheet 5, in which case the arc occurs between electrode 1 and metal 11 as in conventional welding.

Gases formed by chemical reaction of the flux due to welding heat are expelled through check valves 7 located along two longitudinal sides when pressure is higher than the ambient pressure. Welding is therefore performed under a completely protected environment.

After the layer-filled enclosure 6 is delivered to the welding site by a driver or other means, the slot 16 of the enclosure is aligned with the joint 12 of the plates 11 to be welded by means of alignment guides 9. The bottom sheet 5 of enclosure 6 is pressed against plates 11 to displace most or all of the water between sheet 5 and plates 11. A slight outward bulge in sheet 5 before pressing is desirable for this purpose. A resilient sealing member 4 of rubber, plastic or other suitable material, on the bottom sheet 5 preferably near its periphery, provides a water seal when the enclosure 6 is in place. A suitable clamping device such as electromagnet 13 may hold enclosure 6 in place during the welding process. Other mechanical means or manual pressure could be used for holding enclosure 6 in place.

The enclosure 6 has a slidable cover 10 which retains the contents of the enclosure 6 after it has been prepared with its layers of material and during the period that it is underwater and being delivered to the welding site. The cover 10 is removed before welding is to take place, after the enclosure has been placed over the joint with the slot. Alternatively, the cover 10 may be pushed along by the electrode 1 during the weldig process. Also, another alternative is to have the cover 10 made of a thin tearable material, such as plastic, which is perforated by electrode 1 at the commencement of welding and is further torn as the electrode is moved along the slot 16. The cover 10 may be dispensed with if the filled enclosure 6 is maintained relatively level for all but short periods of time, which are insufficient for significant flow of sealing layer 2 material out of enclosure 6.

The process of welding after the enclosure 6 has been clamped to the metal to be welded is simple. The energized electrode is inserted into the enclosure 6 through the layers 2, 3 and 8 at one end of the slot 16. After the welding arc occurs, the electrode is moved along the slot at the proper rate to achieve a good weld bead. The viscous fluid layer 2 at the top of the enclosure closes around the electrode 1 moving in direction 17 sufficiently rapidly to prevent substantial amounts of water from penetrating layer 2 to be absorbed by layer 3. The electrode 1 and enclosure 6 are removed at the completion of the weld.

While the particular embodiment of the invention specifically discussed above seems preferable at the present time, modification thereto may occur to those skilled in the art without departing from the spirit and scope of the invention. Hence, the invention is not to be construed as limited to the particular embodiment shown and described herein, except as defined by the appended claims.

What is claimed is:

1. Apparatus for underwater arc welding comprising:
   an enclosure having a perforable bottom,
   said enclosure containing layers of welding flux, an insulating powder and a water-insoluble, high-viscosity liquid in that order on said bottom,
   a longitudinal slot in the top of said enclosure whereby an electrode may enter said enclosure through said slot to penetrate said layers to perforate said bottom.
2. The apparatus of claim 1 comprising in addition a resilient sealing member attached to the bottom of said enclosure.
3. The apparatus of claim 1 wherein said perforable bottom is a thin metallic sheet capable of being perforated by the arc produced by electrode when energized.
4. The apparatus of claim 1 wherein said perforable bottom is a thin non-metallic sheet capable of being perforated by contact with the electrode.
5. The apparatus of claim 1 wherein said liquid is a polymer.
6. The apparatus of claim 1 comprising in addition a slidable cover to cover the slot in the enclosure and capable of sliding along said slot in response to movement of the electrode.
7. The apparatus of claim 1 comprising in addition a cover for said slot capable of being perforated by said electrode and being torn by said electrode as it moves along the slot.
8. The apparatus of claim 1 comprising in addition means for expelling gas from said enclosure generated during the welding process.
9. The apparatus of claim 8 where said means comprises
   check valves located along the longitudinal side of the enclosure.
10. The apparatus of claim 1 comprising in addition means for holding the bottom of the enclosure in mechanical contact with the metal to be welded.
11. The apparatus of claim 10 wherein said holding means is an electromagnet.
12. A method for underwater arc welding joints in metal pieces comprising
    preparing out of water an enclosure having a perforable bottom,
    said enclosure containing layers of welding flux, an insulating powder and a water-insoluble, high-viscosity liquid in that order on said bottom,
    a longitudinal slot in the top of said enclosure to allow an electrode to enter said enclosure through said slot to penetrate said layers to perforate said bottom,
    placing said enclosure in contact with the metal to be welded with its slot over and along the joint to be welded,
    inserting an energized electrode through said slot to make electrical contact with said metal to form an arc,
    moving said electrode along said slot while maintaining said arc to produce a weld along said joint,
    said enclosure and metal being underwater during said welding.

* * * * *